No. 724,465. PATENTED APR. 7, 1903.
W. G. HAAS.
FISHING REEL.
APPLICATION FILED MAR. 21, 1901.
NO MODEL.
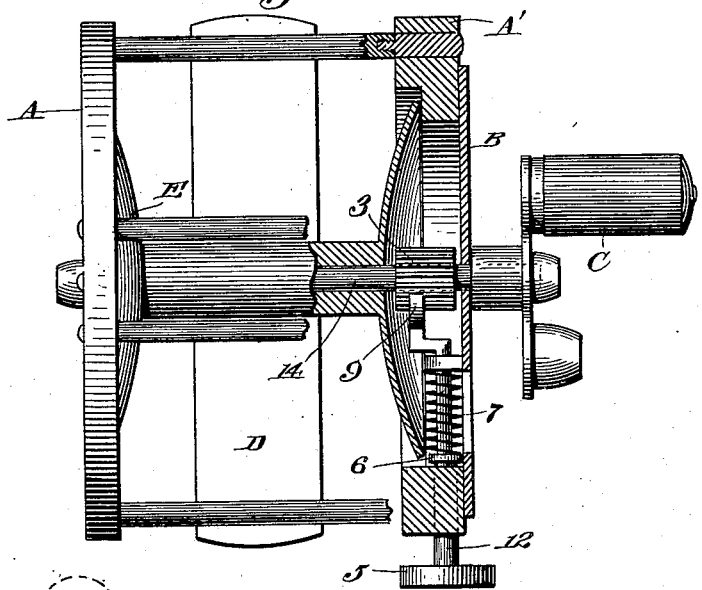
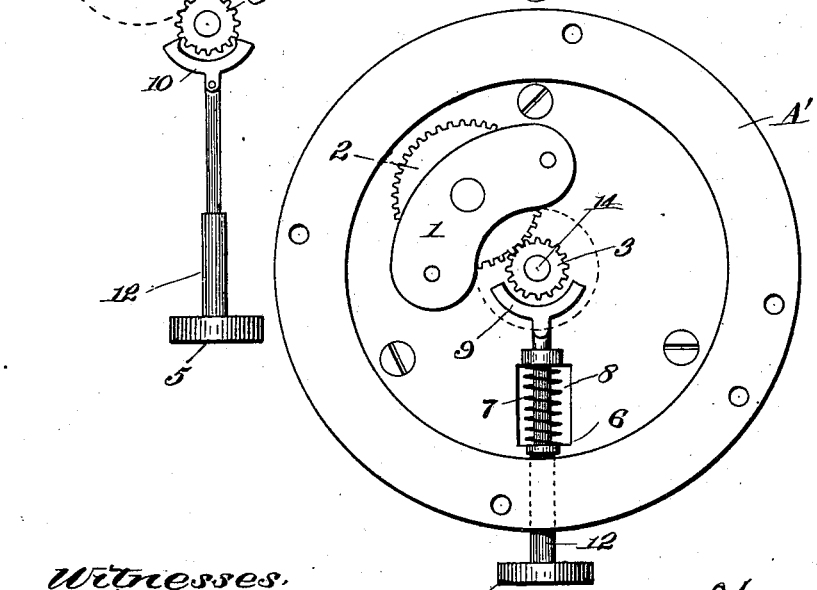
Witnesses.
Ed. J. Pickering
J. D. Brunner
Inventor:
Walter G. Haas
By B. Pickering, Atty.

UNITED STATES PATENT OFFICE.

WALTER G. HAAS, OF DAYTON, OHIO.

FISHING-REEL.

SPECIFICATION forming part of Letters Patent No. 724,465, dated April 7, 1903.

Application filed March 21, 1901. Serial No. 52,134. (No model.)

*To all whom it may concern:*

Be it known that I, WALTER G. HAAS, a citizen of the United States, residing at Dayton, in the county of Montgomery and State of Ohio, have invented certain new and useful Improvements in Fishing-Reels; and I do hereby declare that the following is a full, clear, and exact description of the invention, which will enable others skilled in the art to which it appertains to make and use the same, reference being had to the accompanying drawings, and to the characters of reference marked thereon, which form a part of this specification.

My invention relates to improvements in fishing-reels, the features of which will be fully hereinafter described and claimed.

The object of my invention is to arrest the turning of the spool in casting the bait, and thereby preventing the paying out of too much line, and to cause the bait to drop at the desired place. The objects are accomplished by the mechanism illustrated in the accompanying drawings, in which—

Figure 1 is a top view of a known form of fishing-reel with portions cut away. Fig. 2 is a view of the inner face of the right end of the same. Fig. 3 is a detailed view of a modified form of the brake-piece.

Like letters and numerals designate like parts throughout the several views.

In the first view the handle C is connected directly to the spool-shaft, and in the second view said handle is connected to the shaft of the cog-wheel 2 (shown in solid line) and meshes with the pinion 3, (likewise in solid line,) rigidly attached to the spool-shaft, and the effect of this gear is to quadruple the motion of the spool.

The device is readily adapted to different forms of reels and has special relation to the central spindle and the inclosing frame for the spool.

The brake is composed of the rod 12, held in an orifice of part A', with the thumb-piece 5 on its top and the shoe 9 on its lower end, the plate 6, which bears against the shoulder of said rod, and the spiral spring 7, supported on said rod within the recess 8 of the frame, against the inner edge of which it bears. This spring holds the shoe 9 out of contact with the pinion of the spindle.

The two parts of the frame A A' are held together by the usual transverse rods, and central in these parts are the bearings for the spindle 14, to which the spool E is rigidly attached. The plate 1 serves to support the inner end of the spindle, and the outer end is held in the plate B, secured by screws to part A', and on this spindle is attached the handle-crank C.

The construction shown by Fig. 3 is identical with the former, with the exception that the shoe 10 is pivotally held on the rod 12. One end of this shoe is formed to partly enter the recesses of the teeth of the pinion and the other bears on the outer surface and will thus oscillate as the reel revolves if a slight pressure is given the brake by the application of the thumb.

The part D is secured to the fishing-rod, and to the reel is attached one end of the line, and the other end is passed through a series of eyelets attached to the rod.

The operation is briefly thus: The bait is attached to the hook, the pole is then grasped in the right hand, with the thumb resting gently on the button of the brake, the pole is swung to cast the bait, and at the proper time the thumb is pressed on said brake and the movement of the spool is instantaneously arrested. When the pressure is released, the resiliency of the spring raises the shoe and releases the spool.

It is possible to dispense with the spring and its bearing-plate and yet the device would be effective.

Having fully described my invention, what I claim, and desire to secure by Letters Patent, is—

1. In a fishing-reel the combination of the spindle to which the spool is rigidly attached, the pinion on said spindle, the depressing-rod, the plate held on said rod and in a recess of the frame, the spiral spring, the shoe with curved under surface adapted to engage said pinion to arrest the movement, substantially as described.

2. In a fishing-reel the combination of the spindle, the pinion attached to said spindle, the depressing-rod, the plate held on said rod and in a recess of the frame, the spiral spring with bearing in said recess, the oscillating shoe adapted to engage the surface of said pinion, substantially as described.

In testimony that I claim the foregoing as my own I affix my signature in presence of two witnesses.

WALTER G. HAAS.

Witnesses:
B. PICKERING,
W. H. H. ECKI.